Figure 1:
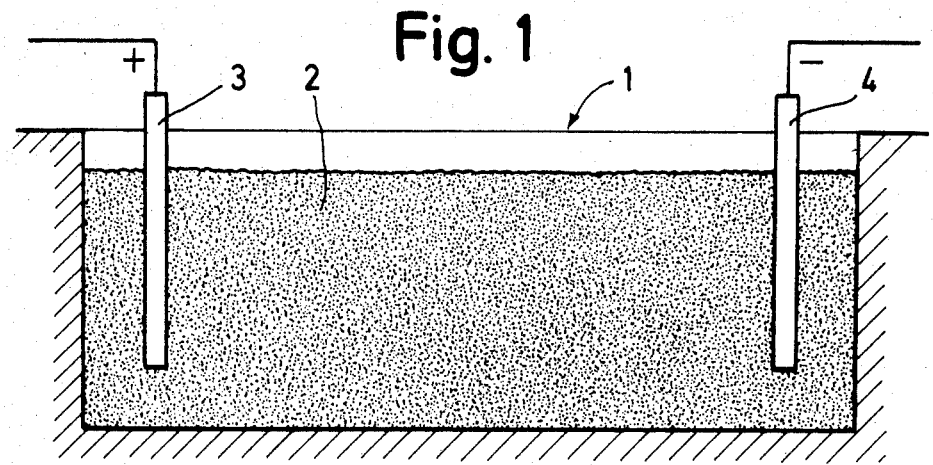

United States Patent [19]

Müller

[11] Patent Number: 4,654,071

[45] Date of Patent: Mar. 31, 1987

[54] PROCESS FOR THE TREATMENT OF LIQUID MANURE

[75] Inventor: Wolfgang Müller, Hülben, Fed. Rep. of Germany

[73] Assignee: Alfa-Laval Agrar GmbH, Hülben, Fed. Rep. of Germany

[21] Appl. No.: 549,887

[22] Filed: Nov. 9, 1983

[30] Foreign Application Priority Data

Nov. 13, 1982 [DE] Fed. Rep. of Germany ....... 3242124

[51] Int. Cl.$^4$ .................................................. C05F 3/00
[52] U.S. Cl. ........................................ 71/12; 204/131; 204/149; 71/15; 71/21
[58] Field of Search ................... 422/22; 204/131, 149; 71/12, 13, 15, 21

[56] References Cited

U.S. PATENT DOCUMENTS

| | | | |
|---|---|---|---|
| 3,645,119 | 4/1972 | White et al. | 204/228 |
| 4,193,854 | 3/1980 | Drnevich et al. | 204/149 |
| 4,200,505 | 4/1980 | Day et al. | 204/131 X |
| 4,291,125 | 9/1981 | Greatbatch | 204/131 X |

FOREIGN PATENT DOCUMENTS

| | | |
|---|---|---|
| 2067724 | 8/1971 | France . |
| 2112286 | 6/1972 | France . |
| 2412504 | 7/1979 | France . |
| 47-44310 | 4/1974 | Japan ................................ 204/149 |
| 622691 | 5/1949 | United Kingdom . |

Primary Examiner—Ferris H. Lander
Attorney, Agent, or Firm—Kenway & Jenney

[57] ABSTRACT

In order to reduce the volume increase of liquid manure during its storage, a process is proposed for the treatment of liquid manure in which at least one copper electrode and one counter-electrode are placed in the liquid manure, and copper ions from the copper electrode connected as the anode are introduced into the liquid manure by the application of a DC voltage which is preferably below the gassing voltage of the liquid manure.

7 Claims, 5 Drawing Figures

PROCESS FOR THE TREATMENT OF LIQUID MANURE

This invention concerns a process for the treatment of liquid manure.

When processing liquid manure, lengthy storage times frequently result from operating considerations. Also, because of the seasonally different production of plants, a continuous application of liquid manure is not possible, so that substantial storage times are necessary for this reason also. A storage capacity for liquid manure which is produced is among the fixed components of an enterprise which manages liquid manure.

In the size of this storage capacity, not only the average amount of liquid manure produced per animal and per day is taken into consideration, but it is necessary to provide for additions for the volume increase occurring during the storage time, which typically amounts to several weeks, occurring because of anaerobic fermentation processes and other decomposition processes, and which can amount to between 20 and 30% depending on the season. It is therefore necessary to make available substantially larger storage capacities because of this volume increase which always occurs.

Also undesirable in the storage of liquid manure is the odor nuisance caused by the liquid manure, which can be so strong that it is impossible for farms managing liquid manure to become established in the vicinity of residential settlements.

The purpose of this invention is to describe a process for the treatment of liquid manure with which the undesired volume increase of the liquid manure can be prevented in lengthy storage.

This problem is solved in a process pursuant to the invention for the treatment of liquid manure by placing at least one copper electrode and a counterelectrode in the liquid manure, and by introducing copper ions into the liquid manure by applying a DC voltage from the copper electrode connected as the anode, which is preferably below the gassing voltage of the liquid manure.

It has been found surprisingly that the undesired volume increase is practically completely suppressed by this electrolytic introduction of copper ions into the liquid manure, even in case of extended storage. It is also surprising that in the treatment pursuant to the invention, the disturbing odor formation of the liquid manure can also be substantially reduced, and in particular when using cattle manure, it can even be essentially prevented. Finally, it is also possible by using the process pursuant to the invention to selectively destroy certain disease-causing agents in the liquid manure, such as salmonella or colibacteria. It is thereby possible to apply the liquid manure earlier than was possible with procedures known heretofore, in which the liquid manure had to be stored for months until self-destruction of these disease-causing agents occurred during long-term storage.

It should be pointed out only for the sake of completeness that a process is actually known for the disinfection of drinking water, in which silver ions are introduced electrolytically into the water (German Pat. No. 695,322), but this known process, which is known only for the treatment of drinking water, can provide no suggestion that the volume increase of liquid manure can be prevented by the introduction of copper ions into it.

It is beneficial if both electrodes are chosen to be made of copper, and the voltage is reversed after a period of time which is greater than the time of migration of the copper ions between the two electrodes. In this way, the erosion of the electrodes can be reduced, since the two electrodes are connected alternately as the cathode and as the anode, so that they do wear at a certain rate, but are regenerated thereafter by the deposition of copper ions.

In accordance with the invention, the current density is chosen to be between approximately 1 $mA/m^2$ of copper electrode area, and approximately 1 $A/m^2$ of electrode area, preferably between approximately 50 and 200 $mA/m^2$.

It is also beneficial if a concentration of copper ions of between 100 and 500 gamma/liter of liquid manure is maintained in the liquid manure.

In a refinement of the process pursuant to the invention, it is provided that the copper electrode connected as the anode is replaced by an inert electrode (carbon electrode) for the removal of the copper ions before the end of the treatment, and the treatment is continued for a rather long period of time (1 to 5 days).

In this case, current densities of the order of magnitude of 1 $A/m^2$ of electrode area can be chosen for the removal of the copper ions and to remove heavy metal ions. It is also favorable in this case if the liquid manure is circulated between two electrodes separated by 15–20 cm to remove the copper ions or the heavy metal ions.

Preferably, a DC voltage is applied between the electrodes which is below the gassing voltage of the liquid manure. However, if the electrodes are separated by a greater distance, the resistance of the liquid manure between the electrodes becomes so high that the current flowing between the electrodes at this voltage would be too small. In these cases, the voltage can also be increased above the gassing voltage.

In this case, oxygen is evolved in the electrode area, which has a disinfecting action. However, this disinfecting action is restricted to the electrode area, but the action of the copper ions pursuant to the invention occurs in the entire volume of the liquid manure, since the copper ions are distributed through the entire volume of the liquid manure by the current. The effect of copper ions is in no way to be compared with the effect of the oxygen in the electrode area.

Figure 2:
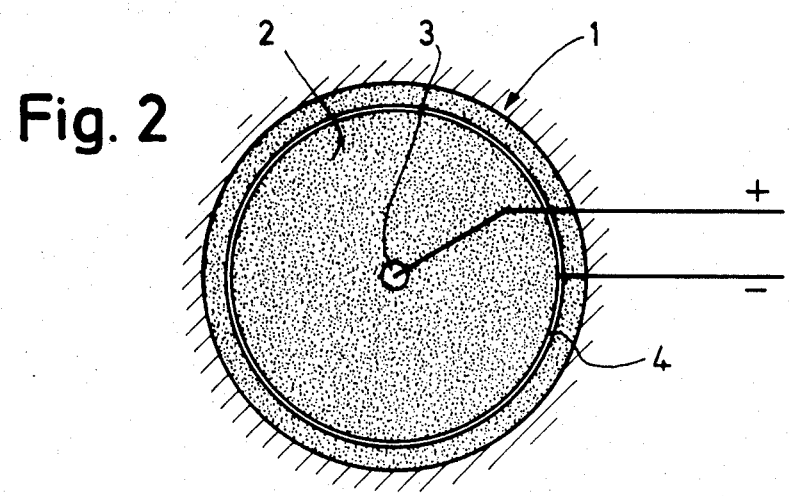
Figure 3:
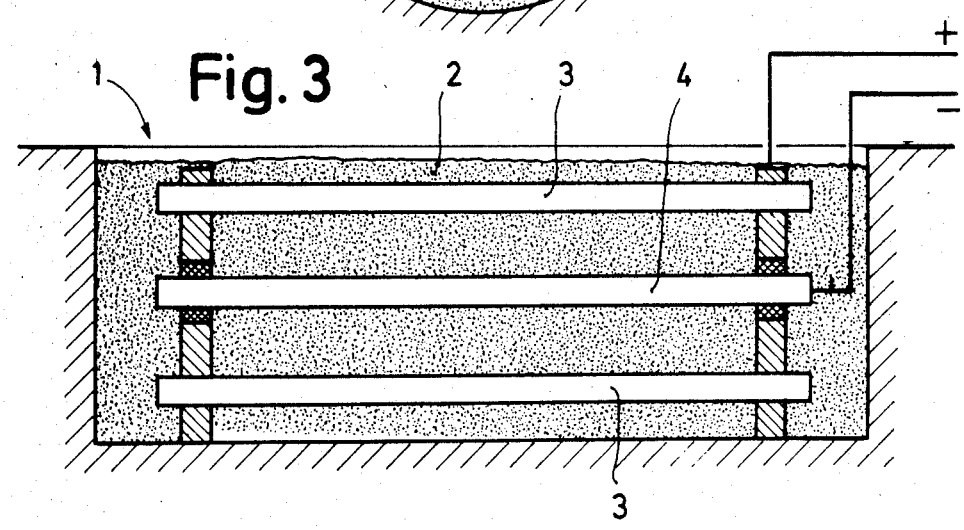
Figure 5:
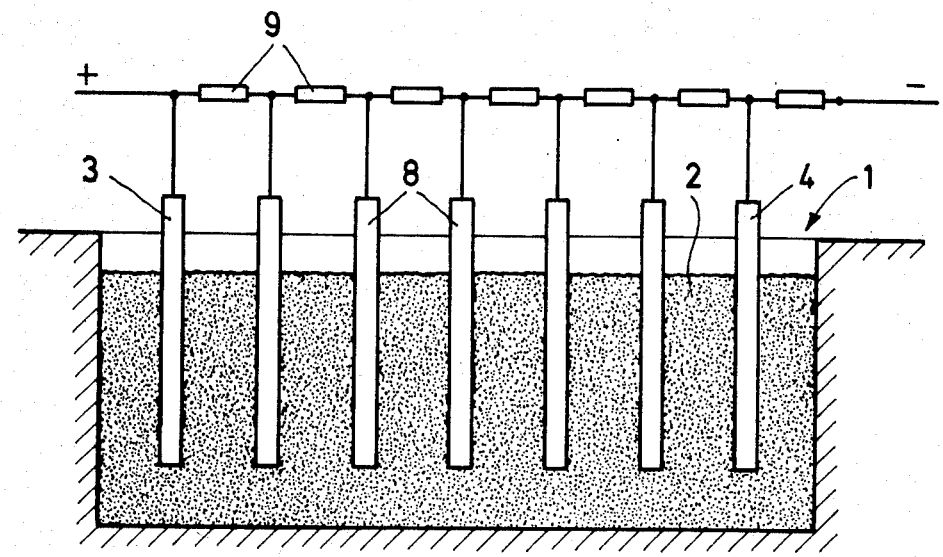
Figure 4:
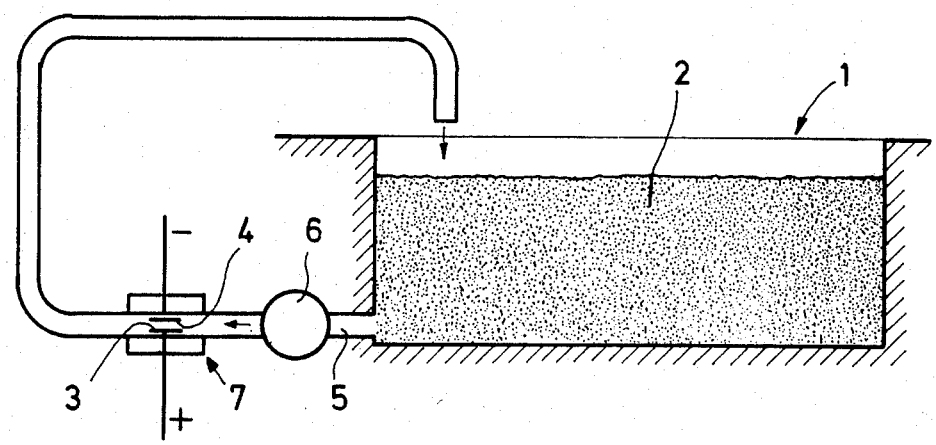

The description below of preferred forms of embodiment of the invention serves as a detailed explanation in combination with the drawing. The drawing shows:

FIG. 1 a schematic longitudinal section view through a liquid manure tank with two copper electrodes immersed in it;

FIG. 2 a top view of a circular cylindrical liquid manure tank with a rim electrode and a central electrode;

FIG. 3 a view similar to FIG. 1 with a modified electrode arrangement;

FIG. 4 a schematic view of a liquid manure tank with circulating device and electrolytic treatment in the circulating device, and FIG. 5 a view similar to FIG. 1 with two main electrodes and several auxiliary electrodes.

The expression liquid manure generally means a mixture of solid and liquid animal excreta such as those produced in farming operations and used for fertilizing purposes. For example, a liquid manure may consist of feces and urine in a ratio of 10:1.

Within the scope of this invention, this liquid manure is treated by introducing copper ions into it electrolytically. This treatment beneficially occurs immediately after the production of the manure and ordinarily lasts for the entire storage period. It is beneficial to remove from the liquid manure the copper ions introduced into the liquid manure prior to the conclusion of the treatment and before the application.

This treatment can take place in the simplest case in a tank 1, as illustrated in FIG. 1. This tank 1, generally a rather large storage tank, holds the liquid manure 2. Electrodes 3 and 4 are immersed into the tank on the two walls of the tank 1, and are connected with the two poles of a constant source of DC voltage.

At least the electrode connected as the anode consists of copper, while the other electrode can consist of any material; in certain cases to be discussed in detail it is desirable to make this electrode of copper also.

The treatment process is conducted by a current flowing between the two electrodes; the current density can be between 1 mA and 1 $A/m^2$ of the copper electrode surface area, preferably of the order of magnitude of 100 $mA/m^2$ of electrode area. The voltage applied between the electrodes in this case remains below the gassing voltage of the liquid manure if the electrode separation permits; otherwise, it is raised slightly above this figure.

If the treatment is prolonged, an equilibrium concentration of copper ions in the liquid manure is reached, which should be at least of the order of magnitude of 200 to 300 gamma/liter of liquid manure.

An arrangement in which the two electrodes consist of copper is desirable. In this case, the electrodes can be reversed in polarity from time to time to increase their lifetimes, so that a release of copper ions and a deposition of metallic copper always occurs alternately on an electrode. The period of time after which the polarity is reversed should be greater than the time of migration of the copper ions from one electrode to the other. A rate of migration of the copper ions in the liquid manure of the order of magnitude of 0.002 cm/second can be assumed here.

Before the use of the liquid manure, the copper ions contained in it can be removed from the liquid manure by replacing the copper anode by an inert anode, such as a carbon anode. If the process is then continued in the normal manner, the copper ions accumulate on the counterelectrode and are thus removed from the liquid manure. It is beneficial in this case if a higher current density is chosen for this purpose than during the introduction of the copper ions into the liquid manure, for example, a current density of the order of magnitude of 1 $A/m^2$ of electrode area.

Furthermore, not only copper ions are removed from the liquid manure by this procedure, but also heavy metal ions. This process therefore represents a possibility for eliminating heavy metal ions from liquid manure and can basically also be used with substances other than liquid manure, for example, with sewage sludge, etc. For this reason, the invention also relates to a generally applicable process for the removal of heavy metal ions from liquid manure, sewage sludge, or other fluid mixtures, specifically also without any prior treatment of the mixture by the introduction of copper ions.

The process pursuant to the invention can be carried out with any desired electrode arrangements in the liquid manure holding tank; for example, an arrangement is possible as shown in FIG. 2. The holding tank for the liquid manure in this case has essentially a circular cylindrical shape, with the one electrode 4 being designed as an annular electrode extending along the wall, and the other as a rod-shaped central electrode.

In the tank illustrated in FIG. 3, there is a horizontally extended electrode 4 placed in the center of the tank, between two parallel electrodes 4 which are placed near the bottom and near the surface of the tank, and which are connected electrically to one another.

It is also possible to arrange the treatment system outside the actual storage tank and to convey the liquid manure out of the tank into the treatment device, and to recycle it back into the tank. Such an arrangement is illustrated in FIG. 4. In this case, a pipe 5 leads through a circulating pump 6 from the tank 1 into a treatment chamber 7, in which the two electrodes 3 and 4 are placed, and from there back into the tank 1. This arrangement is particularly suitable for the removal of copper ions from the liquid manure, or for the removal of heavy metal ions from liquid manure, sewage sludge, etc. It is beneficial here for the separation of the two electrodes 3 and 4 to be relatively small, for example, of the order of magnitude of 20 cm.

Naturally, such a system can also be used for the introduction of copper ions into liquid manure.

In the arrangement illustrated in FIG. 5, in addition to the main electrodes 3 and 4 at the walls of the tank, several auxiliary electrodes 8 are provided between these, with essentially equidistant positions. All of the electrodes in this system consist of copper. The two main electrodes 3 and 4 are connected to the poles of the voltage source, with adjacent electrodes in each case being connected electrically to one another through a resistor 9. The resistors are chosen here to be of such size that they are 10 to 20 times as high as the ohmic resistance between adjacent electrodes in the liquid manure. In this way, the auxiliary electrodes will act as anodes with respect to the electrodes on one side and as cathodes with respect to the electrodes on the other side. By the positioning of a rather large number of auxiliary electrodes between the main electrodes, a homogenization of the copper ion treatment of the liquid manure is obtained even in large tanks, and in addition, the time of migration of the ions from one electrode to the adjacent electrode is reduced, so that the polarity can be reversed more frequently to increase the lifetimes of the electrodes.

As mentioned previously, the prevention of the volume increase is the most effective when the treatment pursuant to the invention begins immediately after the production of the liquid manure. It is desirable here for electrodes of the type described to be placed even in the collecting tank associated with the stall; such electrodes can then also be provided in the channels which transport the fresh manure from these collecting tanks into the storage tank which is usually at a distance, and of course treatment systems of the type described are provided for in these storage tanks themselves. The arrangement in the transport pipes, for example, can be designed similarly to the system of FIG. 4, i.e., electrodes can be provided in the channels across the direction of flow opposite to one another, between which the liquid manure flows. The treatment process described leads to several desirable effects, namely the reduction or prevention of the volume increase of the liquid manure, the reduction or elimination of the unpleasant intrinsic odor of the liquid manure, and the elimination of specific disease-causing agents in the liquid manure.

These three very different effects are brought about in the same way by the electrolytic introduction of copper ions into the liquid manure, with the effect apparently depending on the deactivation of enzymes. It is also assumed here that a delayed nitrogen degradation in the liquid manure is brought about by the process described, which might increase the fertilizing action when applied to the agricultural areas.

The surprising results of the treatment of liquid manure pursuant to the invention are described below with the use of comparative experiments:

Volume Reduction:

Fresh liquid manure of cattle (cattle feces and cattle urine in a ratio of 10:1) was placed in each of two vertical cylinders, each with a capacity of 1000 ml, at room temperature of 281°±2° K., up to the 500 ml mark. A total of seven series of parallel tests were conducted, and the vertical cylinders were covered with aluminum foil.

One vertical cylinder remained untreated as a control. One vertical cylinder of each series of parallel tests remained untreated as a control, while a copper plate was at the bottom of the other as an electrode (cathode), and the anode was immersed ca. 1 cm into the liquid manure at the top center. The separation of the electrodes was 20 cm, and the resistance of the electrolyte between the electrodes was between 0.5 and 0.6 ohm. The current was regulated at 1 mA by a DC current source.

Tables 1, 1A, 2, and 2A show a summary of the results. At a treatment temperature of 281° K., no volume increase can be found in the samples treated by the method of the process pursuant to the invention, and the volume even drops somewhat below the initial volume, but this decrease can presumably be attributed to drying.

On the other hand, the untreated sample increases its volume on the average from an initial 500 ml to 600.86 ml. This corresponds to an increase of 20.17%. This volume increase is visible even after 10 days. Similar results are obtained at a storage temperature of 293° K.; in this case, the untreated samples show a volume increase of ca. 28% even after 7 days, while the samples treated in accordance with the process described show no volume increase. Comparable results were also obtained with liquid hog manure. In four parallel tests, the treated samples showed no volume increase, while on the other hand, the untreated samples showed an increase of the volume of at least 18%.

TABLE 1

Determination of the volume changes of treated (b.) and untreated (unb.) fresh liquid manure (cattle) at a temperature of 281° ± 1° K. Initial volumes of 500 ml

| Time (days) | EXPERIMENT NO. | | | | | | | | | | | | |
|---|---|---|---|---|---|---|---|---|---|---|---|---|---|
| | 1 | | 2 | | 3 | | 4 | | 5 | | 6 | | 7 | |
| | b. | unb. | b. | unb. | b. | unb. | b. | unb. | b. | unb. | b. | unb. | b. | unb. |
| 1 | 500 | 502 | 500 | 501 | 500 | 501 | 500 | 502 | 500 | 500 | 500 | 500 | 500 | 501 |
| 10 | 501 | 602 | 500 | 601 | 499 | 602 | 501 | 599 | 502 | 598 | 500 | 598 | 500 | 601 |
| 14 | 500 | 602 | 499 | 601 | 498 | 603 | 500 | 605 | 498 | 606 | 498 | 604 | 497 | 600 |
| 21 | 498 | 600 | 496 | 599 | 495 | 600 | 498 | 601 | 496 | 604 | 497 | 600 | 497 | 602 |

TABLE 1A

Averages and standard deviations of the experiments from Table 1

| Time (days) | treated ($\bar{x}$/s) | untreated ($\bar{x}$/s) |
|---|---|---|
| 1 | 500,0/0,0 | 501,0/0,82 |
| 10 | 500,43/0,98 | 600,14/1,77 |
| 14 | 498,57/1,13 | 603,00/2,16 |
| 21 | 496,71/1,11 | 600,86/1,68 |

TABLE 2

Determination of the volume changes of treated (b.) and untreated (unb.) fresh liquid manure (cattle) at a temperature of 293° ± 2° K. Initial volumes 500 ml

| Time (days) | EXPERIMENT NO. | | | | | |
|---|---|---|---|---|---|---|
| | 1 | | 2 | | 3 | |
| | b. | unb. | b. | unb. | b. | unb. |
| 1 | 500 | 506 | 500 | 510 | 500 | 512 |
| 7 | 498 | 645 | 496 | 651 | 497 | 658 |
| 14 | 495 | 635 | 494 | 648 | 495 | 651 |

TABLE 2A

Averages and standard deviations of the experiments from Table 2

| Time (days) | treated ($\bar{x}$/s) | untreated ($\bar{x}$/s) |
|---|---|---|
| 1 | 500,0/0,0 | 509,33/3,06 |
| 7 | 497,0,/1,0 | 651,33/6,51 |
| 14 | 494,67/0,58 | 644,67/8,50 |

Reduction of Inherent Odor:

Each of two containers with one liter of fresh cattle feces was treated with 10% of cattle urine (fresh liquid manure).

Two copper electrodes (area 2 cm$^2$) were immersed into the first container. The current flowing was limited to 1 mA by means of a DC current source connected to the electrodes. The second container was left untreated and served as a control. The room temperature was 289° K.

After a treatment time of 5 days, the liquid manure in the first container had an odor of grass and earth, while the untreated sample still had the initial excrement odor characteristic of the animal species, as at the beginning of the test. This was also present in the treated sample at the beginning of the treatment, but faded during the treatment in the manner described and almost completely disappeared at the end of the test.

This test was repeated in four parallel series in four different rooms and with four different samples of liquid manure. Differences were found only in the time after which the sample had lost the typical odor of excrement.

After a maximum of 10 days of treatment, only an earthy odor reminiscent of grass could be noted in all of the treated samples, even after stirring the liquid manure, while the untreated samples showed piercing inherent odor, especially after stirring.

In the case of hog manure which was also studied, the reduction of odor was not found to the extent observed with cattle manure. However, after 2 days of treatment the initially prevailing strong inherent odor changed into an acidic odor, which persisted until the end of the test after 21 days. The untreated sample showed practically no reduction of the penetrating inherent odor.

At least four test subjects (odor tests) were used for the evaluation of the tests.

Destruction of Disease-Causing Agents:

It is known, for example, that salmonella can survive up to a year in cattle manure, and up to three months in hog manure. In contrast to composting, no heating, which is responsible for the relatively rapid disinfection effect, occurs during the anaerobic storage of liquid manure. The manure is stored in earthen containers in most cases, which guarantee temperatures between 281° and 285° K. over the entire year. These low temperatures lead to the previously mentioned long lifetimes of disease-causing agents in the liquid manure, among other effects.

If it is desired nevertheless to eliminate certain disease-causing agents from the liquid manure within a reasonable time, whether to satisfy statutory regulations in case of epidemic, or to prevent spreading the disease-causing agents into the environment, only chemical disinfection procedures and aeration processes are available at this time. The chemical processes (chloride of lime, chloramine, caustic soda, formaldehyde) lead to a more or less severe change of the liquid manure, so that in extreme cases it even becomes useless for fertilizer purposes.

The aeration processes require large amounts of energy, and pathogenic germs are killed in a reasonable time only with a few processes.

It is significant that pathogenic germs are killed selectively during the treatment pursuant to the invention (for example, salmonella or colibacteria), while the total number of colonies remained nearly constant during the period of treatment of one week, as shown by Table 3 below.

TABLE 3

Total number of colonies from treated and untreated liquid cattle manure (number of colonies/g) (average from four tests)

| Days | 1 | 4 | 5 | 7 |
|---|---|---|---|---|
| Treated sample | $1,17^{-\zeta} \cdot 10^7$ | $5,3 \cdot 10^6$ | $1,8 \cdot 10^7$ | $1,0 \cdot 10^7$ |
| Untreated sample | $5,2 \cdot 10^6$ | $4,0 \cdot 10^6$ | $1,24 \cdot 10^7$ | $1,6 \cdot 10^7$ |

On the other hand, if treated and untreated liquid manure are mixed with a beef broth culture (100 ml) which contains $10^8$ germs/ml, salmonella reproduction is possible in the untreated sample up to the 14th day, while reproduction in the treated substrate is no longer possible even after 28 hours. This result is summarized again in Table 4 below.

TABLE 4

Isolation of *S. typhimurium* from treated and untreated material (experimental germ inoculation of 100 ml of beef broth culture/liter of liquid manure)

| Days | 1 | 2 | 4 | 7 | 14 |
|---|---|---|---|---|---|
| Treated sample | + | − | − | − | − |
| Untreated sample | + | + | + | + | + |

+ = reproduction possible
− = salmonella killed

I claim:

1. Process for the treatment of liquid manure comprising placing at least one copper electrode and one counter-electrode in the liquid manure, introducing copper ions from the copper electrode connected as the anode into the liquid manure by the application of a DC voltage which is preferably below the gassing voltage of the liquid manure, and selecting the current density between said electrode and said counter-electrode to be between approximately 1 $mA/m^2$ of electrode area and approximately 1 $A/m^2$ of electrode area.

2. Process pursuant to claim 1, characterized by the fact that both electrodes are made of copper and the voltage is reversed after a period of time which is greater than the time of migration of the copper ions between the two electrodes.

3. Process pursuant to claims 1 or 2, characterized by the fact that the current density is chosen to be between approximately 50 $mA/m^2$ of electrode area and 200 $mA/m^2$ of electrode area.

4. Process pursuant to claim 1, or 2 wherein a concentration of copper ions of 100 to 500 γ/liter of liquid manure is maintained in the liquid manure.

5. Process pursuant to claims 1 or 2 wherein the copper electrode connected as the anode is replaced by an inert electrode (carbon electrode) prior to the end of the treatment to remove the copper ions, and the treatment is continued for an extended period of time (1 to 5 days).

6. Process pursuant to claim 5, characterized by the fact that current densities of the order of magnitude of 1 $A/m^2$ of electrode area are chosen for the removal of copper ions and for the removal of other heavy metal ions.

7. Process pursuant to claim 6 characterized by the fact that the liquid manure is circulated between two electrodes separated by 15-20 cm to remove the copper ions or the heavy metal ions.

* * * * *